US 7,742,834 B2

(12) United States Patent
Matsushita et al.

(10) Patent No.: US 7,742,834 B2
(45) Date of Patent: Jun. 22, 2010

(54) MANAGEMENT SYSTEM OF SEMICONDUCTOR FABRICATION APPARATUS, ABNORMALITY FACTOR EXTRACTION METHOD OF SEMICONDUCTOR FABRICATION APPARATUS, AND MANAGEMENT METHOD OF THE SAME

(75) Inventors: Hiroshi Matsushita, Hiratsuka (JP); Junji Sugamoto, Oita (JP); Masafumi Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 470 days.

(21) Appl. No.: 11/727,824

(22) Filed: Mar. 28, 2007

(65) Prior Publication Data
US 2007/0276528 A1  Nov. 29, 2007

(30) Foreign Application Priority Data
May 29, 2006  (JP) .............................. 2006-148600

(51) Int. Cl.
G06F 19/00 (2006.01)
G05B 13/02 (2006.01)
H01L 21/00 (2006.01)
G01N 37/00 (2006.01)
(52) U.S. Cl. ........................... 700/110; 700/29; 700/33; 700/51; 700/121; 438/5; 702/84; 702/183
(58) Field of Classification Search ............. 700/28–31, 700/33, 34, 43, 48, 49, 51, 55, 108–110, 700/120, 121, 174, 175; 438/5, 14; 702/81, 702/84, 179, 183; 355/53
See application file for complete search history.

(56) References Cited

U.S. PATENT DOCUMENTS

| | | | | |
|---|---|---|---|---|
| 5,646,870 A | * | 7/1997 | Krivokapic et al. ............. 716/4 |
| 5,659,467 A | * | 8/1997 | Vickers ......................... 700/9 |
| 7,127,358 B2 | * | 10/2006 | Yue et al. ....................... 702/30 |
| 7,151,976 B2 | * | 12/2006 | Lin ............................ 700/108 |
| 2004/0255198 A1 | * | 12/2004 | Matsushita et al. ............. 714/37 |
| 2005/0194590 A1 | | 9/2005 | Matsushita et al. |

FOREIGN PATENT DOCUMENTS

JP   2004-186445   7/2004

\* cited by examiner

*Primary Examiner*—Sean P Shechtman
(74) *Attorney, Agent, or Firm*—Finnegan, Henderson, Farabow, Garrett & Dunner, L.L.P.

(57) ABSTRACT

According to the present, there is proved a semiconductor fabrication apparatus management system having:

a sensor which monitors and outputs a plurality of apparatus parameters of a semiconductor fabrication apparatus which fabricates a semiconductor device;

a measurement unit which measures a dimensional value of the semiconductor device, and outputs the dimensional value as dimensional data;

an apparatus parameter storage unit which stores the apparatus parameters;

a dimensional data storage unit which stores the dimensional data;

an apparatus parameter controller which calculates predicted dimensional data by extracting the dimensional data from the dimensional data storage unit, and controls at least one of the plurality of apparatus parameters on the basis of the predicted dimensional data; and an abnormality factor extraction unit which analyzes correlations between the controlled apparatus parameter and other apparatus parameters, and extracts an abnormal apparatus parameter on the basis of a calculated correlation coefficient.

5 Claims, 8 Drawing Sheets

MANAGEMENT SYSTEM OF SEMICONDUCTOR FABRICATION APPARATUS, ABNORMALITY FACTOR EXTRACTION METHOD OF SEMICONDUCTOR FABRICATION APPARATUS, AND MANAGEMENT METHOD OF THE SAME

CROSS REFERENCE TO RELATED APPLICATION

This application is based upon and claims benefit of priority under 35 USC §119 from the Japanese Patent Application No. 2006-148600, filed on May 29, 2006, the entire contents of which are incorporated herein by reference.

BACKGROUND OF THE INVENTION

The present invention relates to a semiconductor fabrication apparatus management system, an abnormality factor extraction method of a semiconductor fabrication apparatus, and a management method of the same.

A semiconductor fabrication process is required to hold a response variable as a result of the process at a predetermined desired value. For example, a thin film stacking process is required to hold a film thickness as a response variable at a predetermined desired value. Also, an exposure process is required to hold a dimensional value as a response variable within an allowable range with respect to a design value. However, a semiconductor fabrication apparatus may fluctuate a response variable owing to disturbance. In the exposure process, for example, the exposure amount may fluctuate in accordance with the state of an illuminating optical system or the state of a reticle for transferring circuit patterns, thereby fluctuating the dimensional value. This fluctuation in response variable results in a defective product, and decreases the yield of the semiconductor fabrication process.

A semiconductor fabrication process measures various physical amounts by response variable monitoring called QC (Quality Control) when the process is executed. For example, the exposure process measures QC values such as a resist dimensional value and final element dimensional value. Also, various sensors monitor the interior of a semiconductor fabrication apparatus to check whether the apparatus is normally functioning. A semiconductor fabrication apparatus management system like this is called an EES (Equipment Engineering System), and the monitored internal data of the apparatus is called EES data. For example, the EES acquires several hundreds of kinds of EES data such as the exposure amount, focusing value, and developer temperature from an exposure apparatus.

APC (Advance Process Control) which controls a semiconductor fabrication apparatus on the basis of a response variable is performed to hold the response variable constant. In the exposure process, for example, APC controls the exposure amount to hold the resist dimensional value measured as a QC value constant. The exposure amount and resist dimensional value have an almost linear relationship. Therefore, if it is detected from the QC value that the resist dimensional value tends to exceed an allowable range, APC controls the exposure amount so as to decrease the resist dimensional value.

If a QC value fluctuates in a process which performs no APC, an abnormality factor having fluctuated the QC value in an apparatus can be specified by analyzing the correlation between the QC value and EES data (e.g., patent reference 1). However, a process which performs APC holds a QC value constant, and hence cannot specify an abnormality factor in an apparatus even by analyzing the correlation between the QC value and EES data. If this abnormality factor is left uncorrected, it exceeds the control limit of APC and appears as an unexpected defect.

Japanese Patent Laid-Open No. 2004-186445

SUMMARY OF THE INVENTION

According to one of the aspect of the present invention, there is provided a semiconductor fabrication apparatus management system comprising: a sensor which monitors and outputs a plurality of apparatus parameters of a semiconductor fabrication apparatus which fabricates a semiconductor device; a measurement unit which measures a dimensional value of said semiconductor device, and outputs the dimensional value as dimensional data; an apparatus parameter storage unit which stores the apparatus parameters; a dimensional data storage unit which stores the dimensional data; an apparatus parameter controller which calculates predicted dimensional data by extracting the dimensional data from said dimensional data storage unit, and controls at least one of the plurality of apparatus parameters on the basis of the predicted dimensional data; and an abnormality factor extraction unit which analyzes correlations between the controlled apparatus parameter and other apparatus parameters, and extracts an abnormal apparatus parameter on the basis of a calculated correlation coefficient.

According to one of the aspect of the present invention, there is provided a method of extracting an abnormality factor of a semiconductor fabrication apparatus by using a semiconductor fabrication apparatus management system having a sensor, a measurement unit, an apparatus parameter controller, and an abnormality factor extraction unit, comprising: allowing the sensor to monitor a plurality of apparatus parameters of the semiconductor fabrication apparatus; allowing the measurement unit to measure dimensional values of a plurality of semiconductor devices fabricated by the semiconductor fabrication apparatus; allowing the apparatus parameter controller to predict a dimensional value of a semiconductor device to be fabricated next on the basis of the dimensional values, and control at least one of the plurality of apparatus parameters on the basis of the predicted dimensional value; and allowing the abnormality factor extraction unit to analyze correlations between the controlled apparatus parameter and other apparatus parameters, and extract an abnormal apparatus parameter on the basis of a calculated correlation coefficient.

According to one of the aspect of the present invention, there is provided a method of managing a semiconductor fabrication apparatus by using a semiconductor fabrication apparatus management system having a sensor, a measurement unit, an apparatus parameter controller, an abnormality factor extraction unit, and a display unit, comprising: allowing the sensor to monitor a plurality of apparatus parameters of the semiconductor fabrication apparatus; allowing the measurement unit to measure dimensional values of a plurality of semiconductor devices fabricated by the semiconductor fabrication apparatus; allowing the apparatus parameter controller to predict a dimensional value of a semiconductor device to be fabricated next on the basis of the dimensional values, check whether to control a controlled parameter as at least one of the plurality of apparatus parameters on the basis of the predicted dimensional value, and, if the control is to be performed, check whether to analyze correlations between the controlled apparatus parameter and other apparatus parameters on the basis of a value of the controlled apparatus parameter, and perform the control if the correlation analysis is not to be performed; and allowing, if the correlation analysis is to be performed, the abnormality factor extraction unit to calculate a correlation coefficient, extract an abnormal apparatus parameter on the basis of the correlation coefficient, check whether the extracted abnormal apparatus parameter is controllable, output correction information of the abnormal apparatus parameter to the semiconductor fabrication apparatus and display the abnormal apparatus parameter on the display unit if the abnormal apparatus parameter is controllable, and display the abnormal apparatus parameter and a maintenance warning on the display unit if the abnormal apparatus parameter is uncontrollable.

DETAILED DESCRIPTION OF THE INVENTION

An embodiment of the present invention will be explained below with reference to the accompanying drawings.

Figure 1:
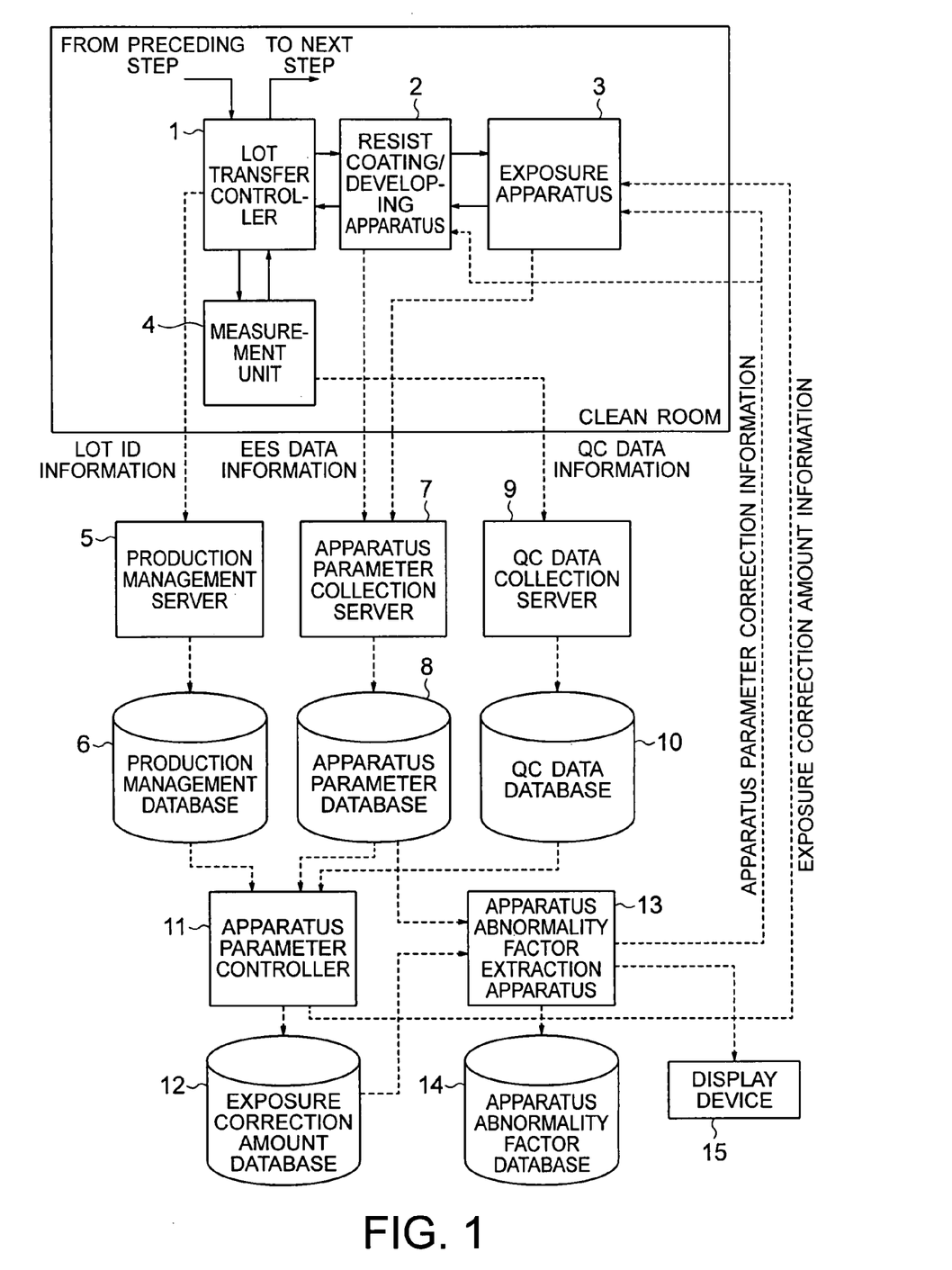
FIG. 1 is a view showing an outline of the configuration of a semiconductor fabrication system according to an embodiment of the present invention.

FIG. 1 shows an outline of the configuration of a semiconductor fabrication apparatus management system (exposure process) according to the embodiment of the present invention. A resist coating/developing apparatus 2 coats wafers of a lot (not shown) having undergone a preceding step with a resist, and an exposure apparatus 3 transfers and exposes patterns. The resist coating/developing apparatus 2 removes regions irradiated with light. This exposure process exposes the gate of a transistor, and controls the exposure amount to hold the quality (gate dimensional value) constant. Apparatus parameters include the exposure amount, focusing value, and the like as will be described later. A controlled object in this process is the exposure amount, and this apparatus parameter as a controlled object will be referred to as a controlled parameter hereinafter.

Sensors (not shown) attached to individual units of the resist coating/developing apparatus 2 and exposure apparatus 3 monitor the operation environment information (apparatus parameters) such as the states and set values of these apparatuses. The apparatus parameters include a plurality of pieces of information such as the exposure amount, focusing value, developer temperature, and reticle transmittance. The average value per unit time of wafer processing is calculated from the monitored data. An apparatus parameter collection server 7 stores the average value in an apparatus parameter database 8.

A measurement unit 4 measures gate dimensional values at five points on the surface of each wafer of the lot having undergone the exposure process. The measurement unit 4 uses a critical dimension measurement SEM (Scanning Electron Microscope). A QC data collection server 9 stores, in a QC database 10, the average value of the gate dimensional values measured at the five points as QC data information.

A lot transfer controller 1 controls the transfer of a lot to be exposed to the resist coating/developing apparatus 2, exposure apparatus 3, and measurement unit 4. The lot transfer controller 1 outputs lot ID information of the lot to be processed, and a production management server 5 stores the output lot ID information in a production management database 6.

When the exposure amount requires correction, an apparatus parameter controller 11 calculates an exposure correction amount and outputs it to the exposure apparatus 3. If an abnormality occurs in the semiconductor fabrication apparatus (the resist coating/developing apparatus 2 or exposure apparatus 3), an apparatus abnormality factor extraction apparatus 13 extracts the abnormality factor, and outputs apparatus parameter correction information for correction. The apparatus abnormality factor extraction apparatus 13 also displays the abnormality factor and a maintenance warning on a display device 15. The display device 15 is a screen such as a monitor, and it is possible to use, e.g., a liquid crystal display device, light-emitting diode panel, or electroluminescence panel.

Figure 2:
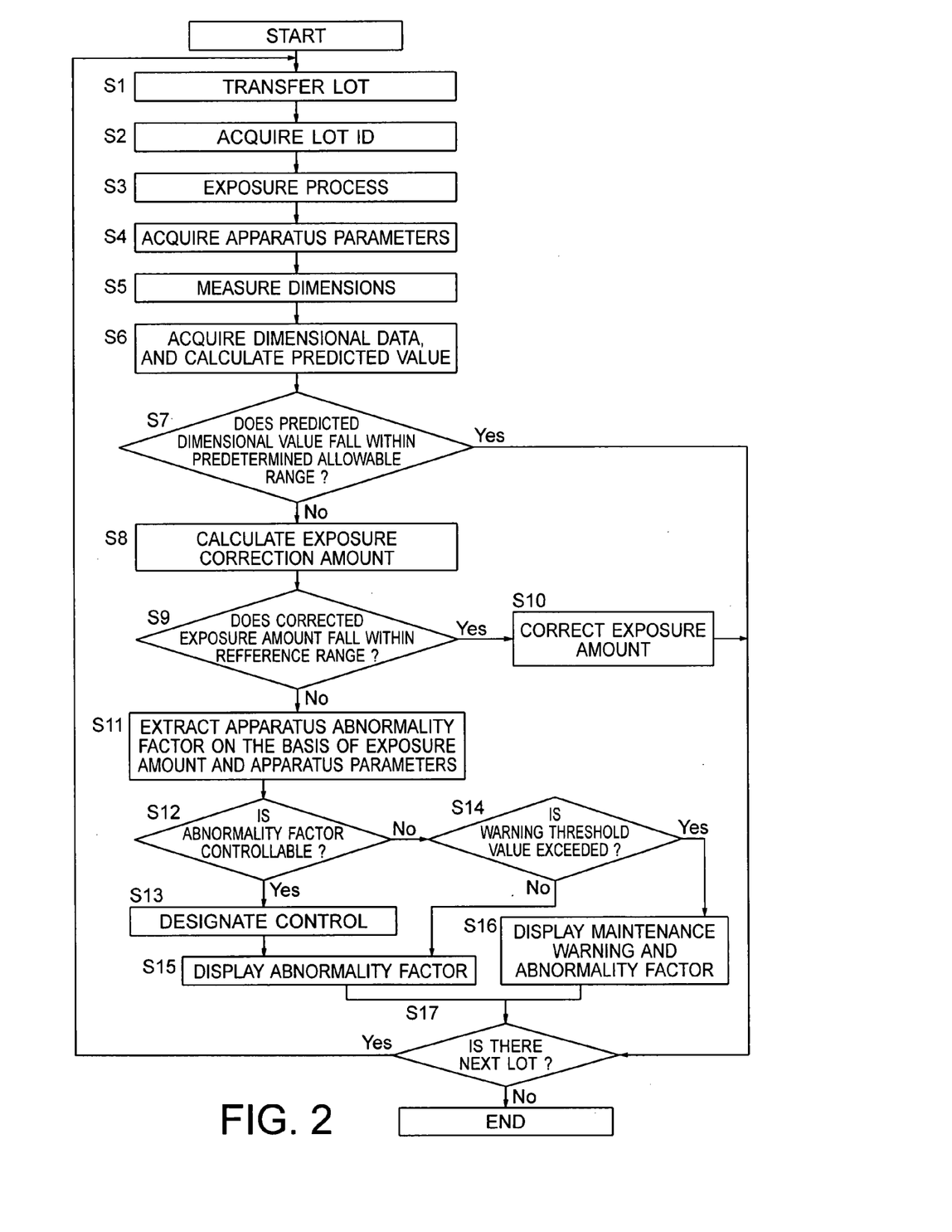
FIG. 2 is a flowchart showing a semiconductor fabrication apparatus management method according to the embodiment of the present invention.

The process procedure of the semiconductor fabrication system and the operation of each unit will be explained below with reference to a flowchart shown in FIG. 2.

(Step S1) A lot having undergone a preceding step is transferred together with the lot ID information, and the lot transfer controller 1 outputs the lot ID information.

(Step S2) The production management server 5 stores the lot ID information in the production management database 6.

(Step S3) The resist coating/developing apparatus 2 and exposure apparatus 3 perform a transistor gate exposure process on wafers of the lot.

(Step S4) While the exposure process is performed, the apparatus parameter database 8 stores the apparatus parameters monitored by the sensors (not shown) attached to the individual units of the resist coating/developing apparatus 2 and exposure apparatus 3.

(Step S5) The measurement unit 4 measures the gate dimensional values at five points on the surface of each wafer of the lot having undergone the exposure process.

Figure 3:
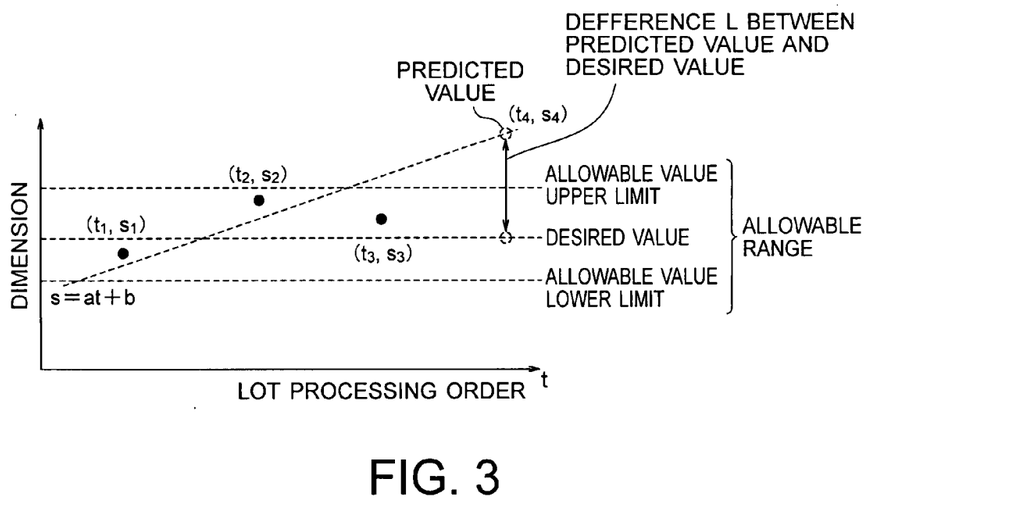
FIG. 3 is a graph showing an example of prediction of the dimension of a semiconductor device to be fabricated.

(Step S6) The QC data collection server 9 stores, in the QC database 10, the average value of the gate dimensional values measured at the five points as QC data information of the lot. The apparatus parameter controller 11 predicts the dimensional value of the next lot from the dimensional values of three past lots stored in the QC database 10. FIG. 3 is a graph showing the predicted value of the dimension. The method of prediction is to obtain an expression which represents an approximate straight line indicating a time-series change in dimensional value by the method of least squares by using the dimensional values of three past lots, and predict the dimensional value of the next lot from the expression. Letting t be the process number of a lot, s be the dimensional value, and $(t_1, s_1)$, $(t_2, s_2)$, and $(t_3, s_3)$ be the values of the three past lots, approximate straight line s=at +b is represented by $$s = at + b,$$

$$a = \frac{k\sum_{i=1}^{k} t_i s_i - \sum_{i=1}^{k} t_i \sum_{i=1}^{k} s_i}{k\sum_{i=1}^{k} t_i^2 - \left(\sum_{i=1}^{k} t_i\right)^2},$$

$$b = \frac{\sum_{i=1}^{k} t_i^2 \sum_{i=1}^{k} s_i - \sum_{i=1}^{k} t_i s_i \sum_{i=1}^{k} t_i}{k\sum_{i=1}^{k} t_i^2 - \left(\sum_{i=1}^{k} t_i\right)^2}$$

where k=3 because the values of the three past lots are used.

A predicted dimensional value $s_4$ is obtained by substituting a process number $t_4$ of the next lot into the above equations.

(Step S7) If the predicted value falls within a predetermined allowable range, the process advances to step S17 of checking whether to process the next lot, without correcting the exposure amount. If the predicted value falls outside the predetermined allowable range, the process advances to exposure correction amount calculation step S8.

Figure 4:
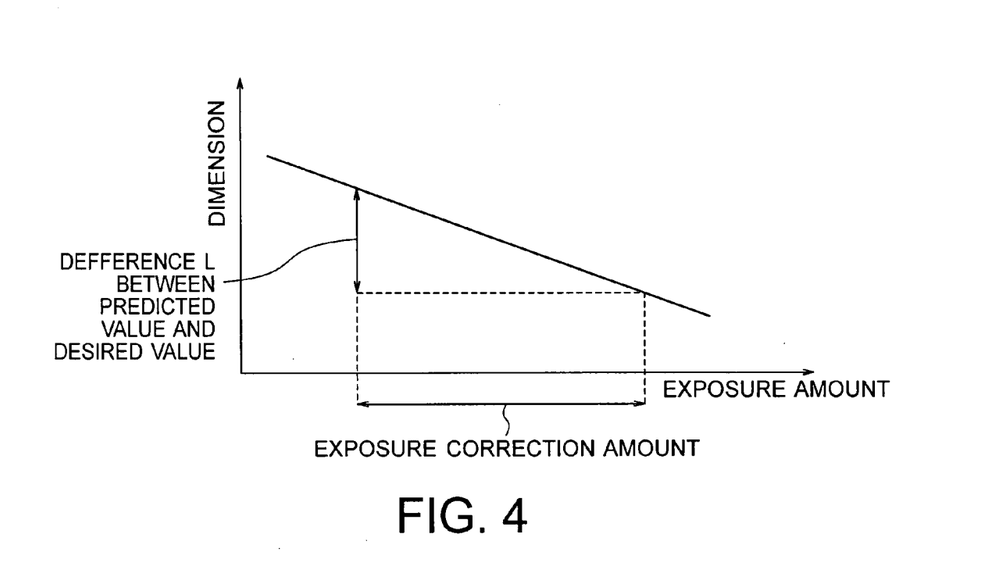
FIG. 4 is a graph showing the relationship between the dimension of the semiconductor device and the exposure amount.

(Step S8) A correction value of the exposure amount is calculated. FIG. 4 shows the relationship between the dimensional value and exposure amount. As shown in FIG. 4, the dimensional value and exposure amount have a linear relationship. The apparatus parameter controller 11 calculates an exposure correction amount necessary to correct the predicted dimensional value to a desired value.

(Step S9) The apparatus parameter controller 11 checks whether the corrected exposure amount falls within a predetermined reference range. If the corrected exposure amount falls within the reference range, the process advances to exposure amount correction designation step S10. If the corrected exposure amount falls outside the reference range, it is possible that the exposure amount falling outside the predetermined reference range is obtained because an abnormality has occurred in the resist coating/developing apparatus 2 or exposure apparatus 3, so the process advances to apparatus abnormality factor extraction step S11. The reference range may also be the average of the exposure amounts from the first lot to the pth (p is an integer of 2 or more) lot ± standard deviation.

(Step S10) The calculated exposure correction amount is transmitted to the exposure apparatus 3 to correct the exposure amount, and the process advances to step S17 of checking whether to process the next lot.

(Step S11) The apparatus abnormality factor extraction apparatus 13 extracts the apparatus abnormality factor. The abnormality factor is extracted by extracting all the collected apparatus parameters from the apparatus parameter database 8, analyzing the correlation between each apparatus parameter and the exposure amount, and comparing the absolute value of a correlation coefficient with a predetermined threshold value. A correlation coefficient R is calculated by $$R = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}},$$

$$\bar{x} = \frac{1}{n}\sum_{i=1}^{n} x_i,$$

$$\bar{y} = \frac{1}{n}\sum_{i=1}^{n} y_i$$

where x is the exposure amount (controlled parameter), y is the apparatus parameter, and n is the number of data (the number of past lots) to be used in the analysis. The correlation coefficient R takes a value within the range of $-1 \leq R \leq 1$. The closer the value to 1, the stronger the positive correlation; the closer the value to $-1$, the stronger the negative correlation. $R=\pm 1$ indicates a perfect correlation, and $R=0$ indicates an uncorrelated state (there is no correlation).

Figure 5:
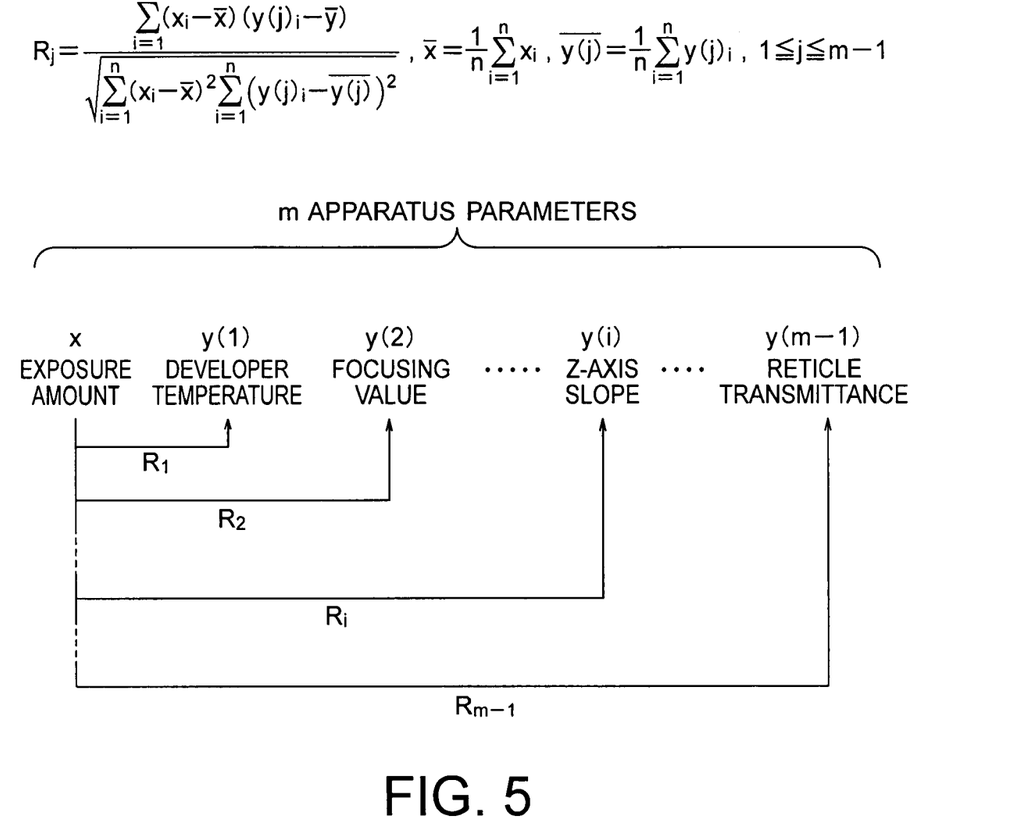
FIG. 5 is a view showing an example of correlation analysis.

When monitoring m types of apparatus parameters as shown in FIG. 5, correlation coefficients between the exposure amount x and (m−1) types of apparatus parameters y(1) to y(m−1) except for the exposure amount are calculated. Accordingly, (m−1) correlation coefficients ($R_1$ to $R_{m-1}$) are obtained.

An abnormal apparatus parameter (abnormality factor) which requires control for correcting the exposure amount to a value falling outside the predetermined reference range has a strong positive or negative correlation with the exposure amount. Therefore, this embodiment sets the threshold value of the absolute value of a correlation coefficient to 0.8. Of the (m−1) correlation coefficients $R_1$ to $R_{m-1}$ calculated by the above equations, a correlation coefficient having an absolute value exceeding 0.8 as the threshold value is extracted as an abnormality factor.

(Step S12) Whether the acquired abnormality factor is a controllable factor is checked on the basis of the information in the apparatus abnormality factor database. If the abnormality factor is not a controllable factor, the process advances to maintenance warning determination step S14. If the abnormality factor is a controllable factor, the process advances to control designation step S13.

(Step S13) Apparatus parameter correction information for controlling the apparatus parameter as the specified abnormality factor is transmitted to the resist coating/developing apparatus 2 or exposure apparatus 3. The resist coating/developing apparatus 2 or exposure apparatus 3 corrects the apparatus parameter on the basis of the apparatus parameter correction information.

(Step S14) The apparatus abnormality factor extraction apparatus 13 compares the value of the apparatus parameter as the abnormality factor with a predetermined maintenance warning threshold value, thereby checking whether to display a maintenance warning. If it is determined not to display the maintenance warning, the process advances to step S15. If it is determined to display the maintenance warning, the process advances to maintenance warning display step S16.

(Step S15) The display device 15 displays the apparatus abnormality factor.

(Step S16) The display device 15 displays the maintenance warning and apparatus abnormality factor.

(Step S17) If there is a next lot, the process returns to step S1 to start new processing. If there is no next lot, the process is terminated.

Figure 6:
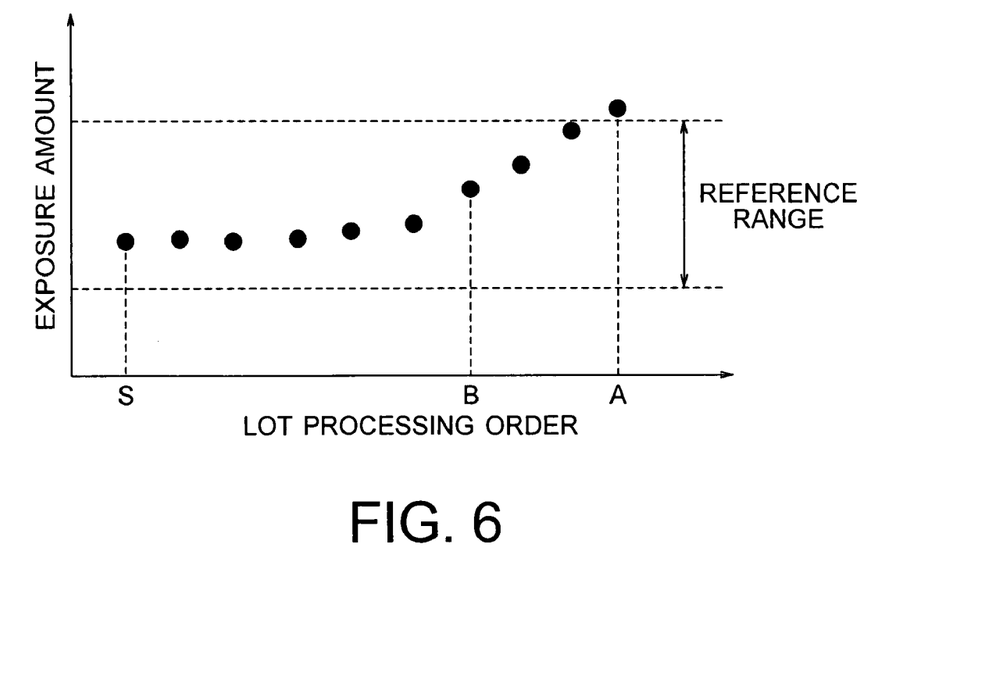
FIG. 6 is a graph showing an example of the change in exposure amount with time.
Figure 7:
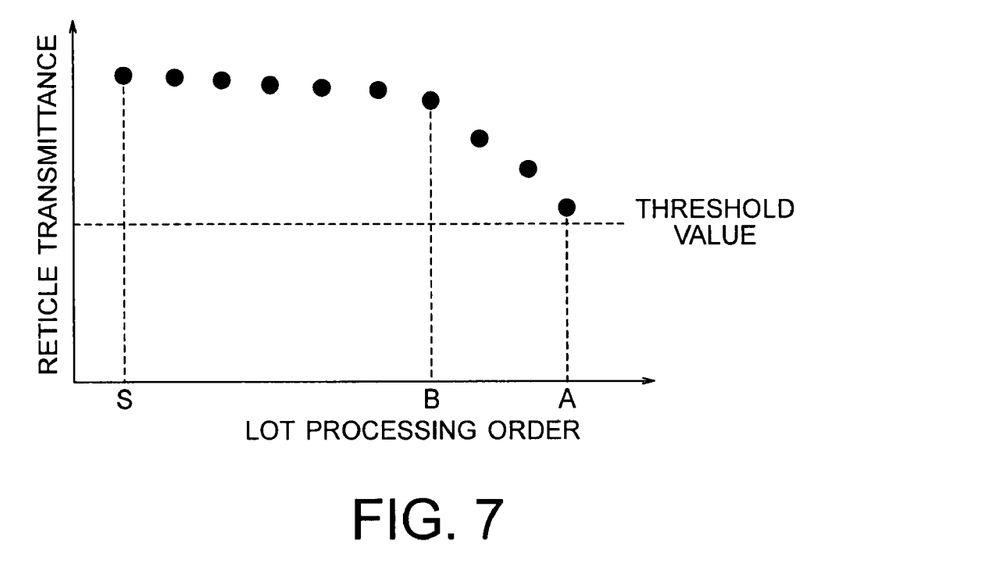
FIG. 7 is a graph showing an example of the change in reticle transmittance with time.

FIG. 6 shows an example of the change in exposure amount with time. As shown in FIG. 6, control which increased the exposure amount was performed from lot B, and the reference range was exceeded when lot A was processed. The correlations between exposure amount data and all collected apparatus parameters from lot S before lot B to lot A were analyzed. Consequently, a reticle transmittance which changed with time as shown in FIG. 7 was obtained as an apparatus parameter (abnormal apparatus parameter) having a correlation coefficient absolute value exceeding a threshold value. The reticle transmittance is not a controllable factor, and the reticle transmittance corresponding to lot A is larger than the maintenance warning threshold value. Therefore, the process is advanced by displaying the abnormality factor "reticle transmittance" on the display device 15. If the reticle transmittance of lot A is equal to or smaller than the maintenance warning threshold value, the display device 15 displays the abnormality factor and maintenance warning. The reticle transmittance rises when the user having confirmed the display cleans the reticle.

Figure 8:
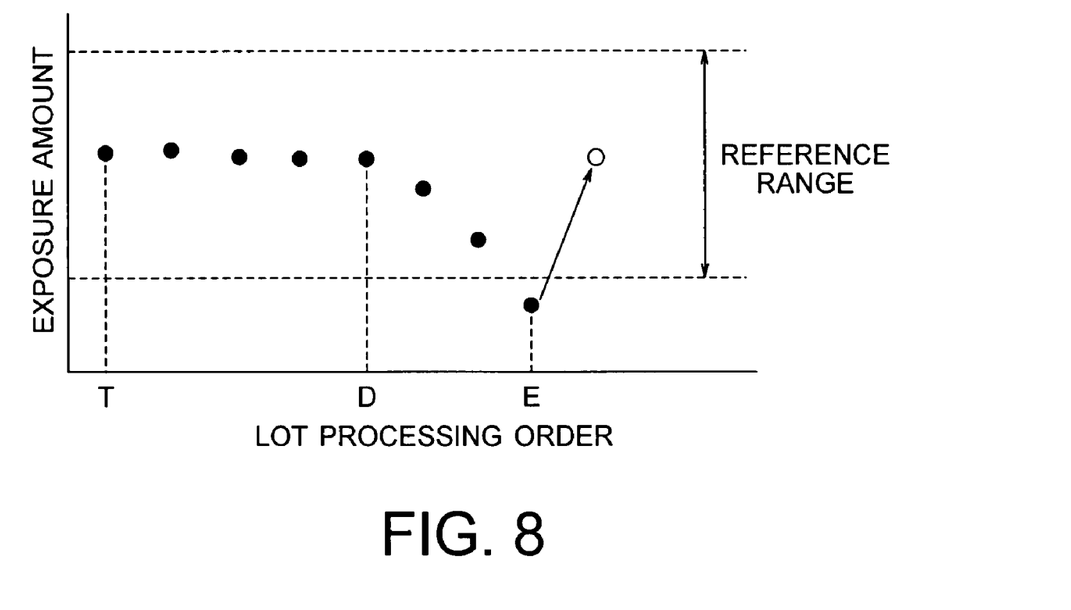
FIG. 8 is a graph showing an example of the change in exposure amount with time.
Figure 9:
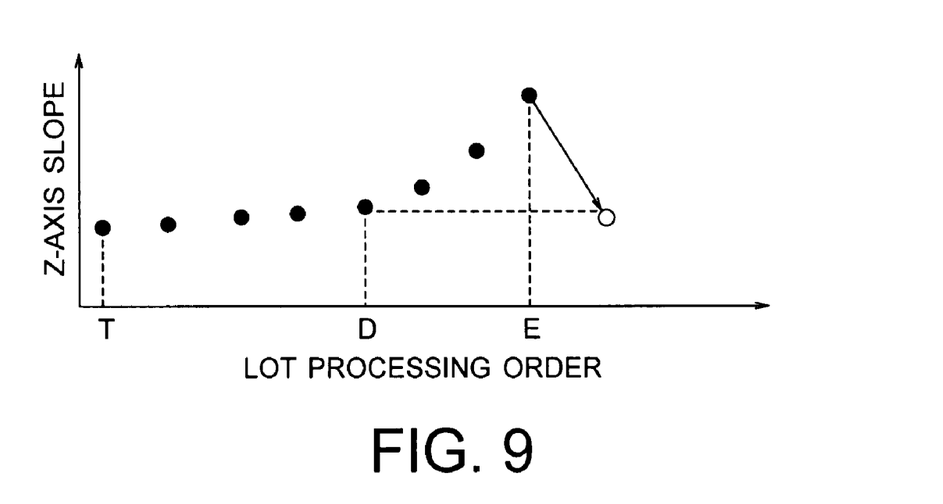
FIG. 9 is a graph showing an example of the change in Z-axis slope with time.

FIG. 8 shows another example of the change in exposure amount with time. As shown in FIG. 8, control which reduced the exposure amount was performed from lot D, and the value exceeded the reference range when lot E was processed. The correlations between exposure amount data and all collected apparatus parameters from lot T before lot D to lot E were analyzed. Consequently, a Z-axis slope which changed with time as shown in FIG. 9 was obtained as an apparatus parameter having a correlation coefficient absolute value exceeding the threshold value. That is, the Z-axis slope was regarded as an abnormality factor. The Z-axis slope is the slope of a stage on which a wafer is fixed with respect to the optical axis, and is a controllable apparatus parameter. In this case, the Z-axis slope was controlled to have the same value as for lot D. As a consequence, the exposure amount became almost equal to that before lot D. If this fluctuation in Z-axis slope is left uncorrected, the limit of correction by the exposure amount is reached before long, and a dimensional abnormality suddenly occurs.

The Z-axis slope may also be controlled to have not the same value as for lot D but the average value of the Z-axis slopes from the first lot to the nth (n is an integer of 2 or more) lot.

COMPARATIVE EXAMPLE

Figure 10:
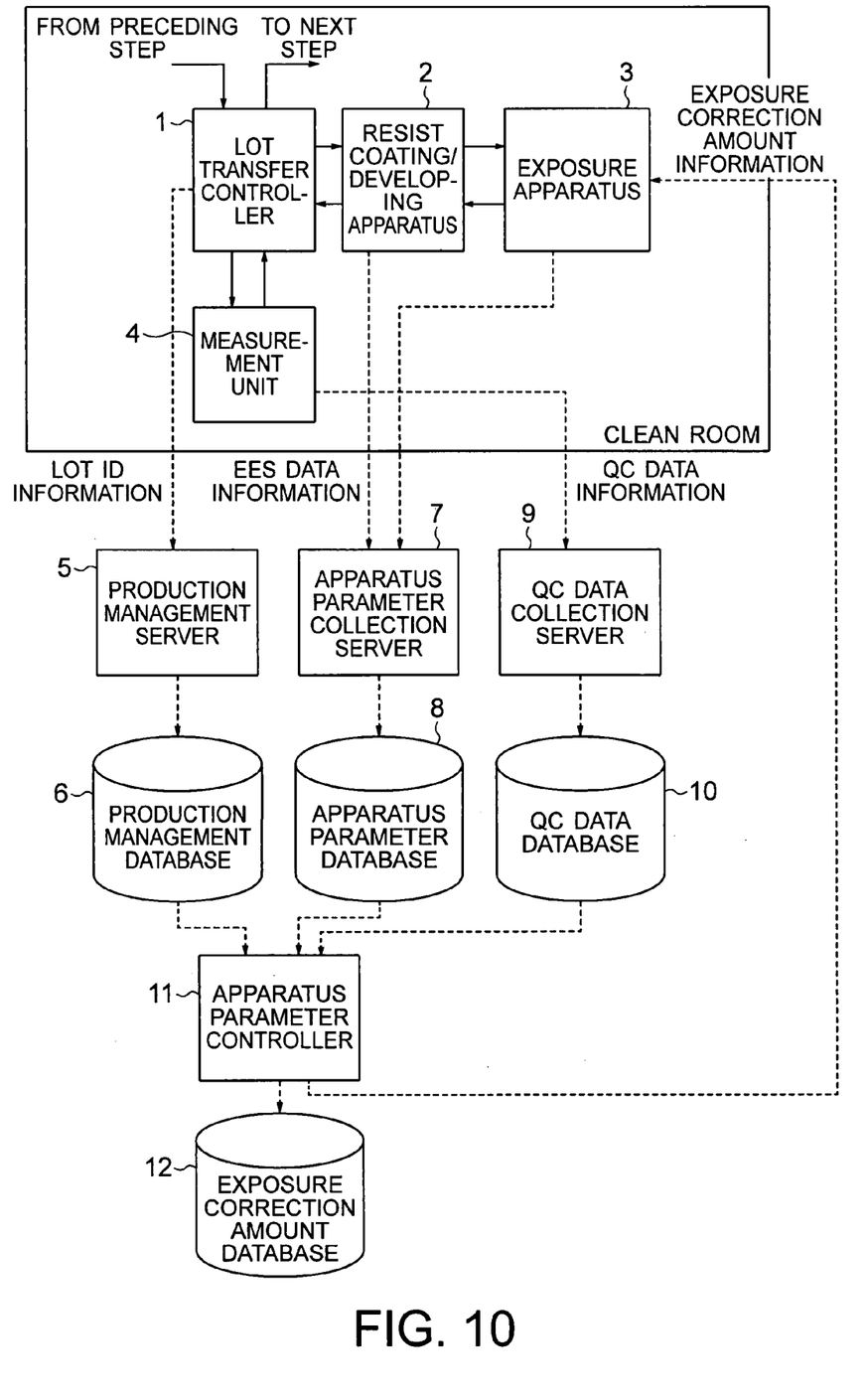
FIG. 10 is a view showing an outline of the configuration of a semiconductor fabrication system according to a comparative example.

FIG. 10 shows an outline of the arrangement of a semiconductor fabrication apparatus according to a comparative example. This semiconductor fabrication apparatus has the same arrangement as the semiconductor fabrication apparatus of the above embodiment, except that the apparatus abnormality factor extraction apparatus 13, apparatus abnormality factor database 14, and display device 15 are omitted.

Figure 11:
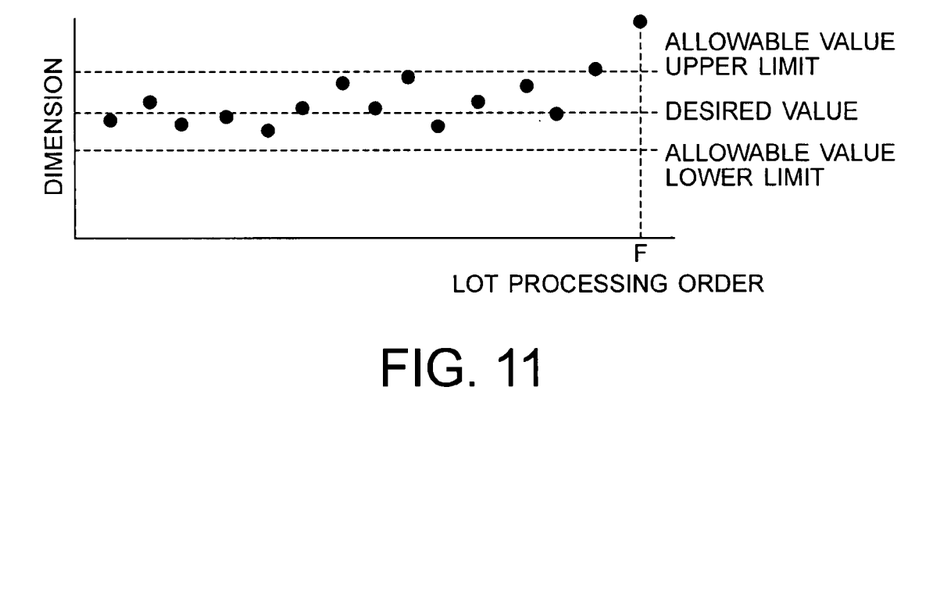
FIG. 11 is a graph showing an example of the change in semiconductor device dimensional value with time.
Figure 12:
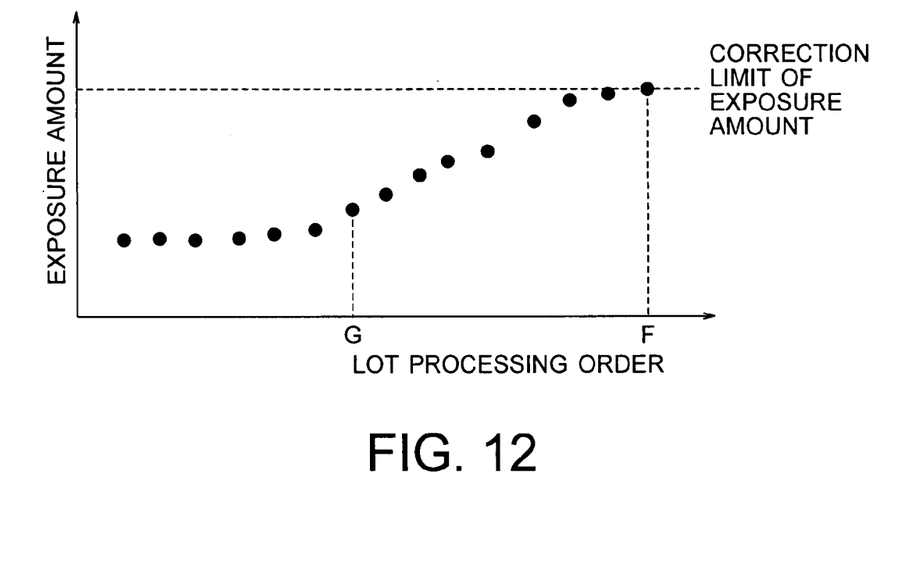
FIG. 12 is a graph showing an example of the change in exposure amount with time.

As in the above embodiment, the dimensional value of the next lot is predicted on the basis of the dimensional values of the past lots, and the exposure amount is controlled to make the predicted dimensional value fall within a predetermined allowable range. FIG. 11 shows an example of the change in dimensional value with time when the semiconductor fabrication apparatus according to this comparative example was used. FIG. 12 shows the exposure amount corresponding to the same lots as in FIG. 11. FIGS. 11 and 12 demonstrate that the dimensional value was controlled to fall within the allowable range by increasing the exposure amount from lot G. However, a product having a dimensional value falling outside the allowable range was fabricated in lot F for which the correction limit of the exposure amount was reached.

As described above, a semiconductor fabrication apparatus incapable of specifying an apparatus abnormality factor cannot prevent a dimensional abnormality and decreases the yield.

Unlike the comparative example as described above, the above embodiment analyzes the correlations between the controlled parameter (exposure amount) and apparatus parameters in a semiconductor fabrication system in which APC holds a response variable (gate dimensional value) constant. This makes it possible to specify an apparatus abnormality factor and prevent a process abnormality.

The above embodiment can specify an abnormality factor in an apparatus in a semiconductor fabrication process in which APC holds a response variable constant.

The above embodiment is merely an example and does not limit the present invention. For example, the above embodiment uses the exposure amount as a controlled parameter to hold the gate dimensional value constant. However, it is also possible to use a plurality of controlled parameters by adding other apparatus parameters. In this case, an abnormality factor can be extracted by analyzing the correlations between these controlled parameters including the exposure amount and the apparatus parameters. Also, the above embodiment predicts the dimensional value of the next lot on the basis of the dimensional values of the three past lots. However, the dimensional value of the next lot may also be predicted on the basis of four lots or more. Furthermore, although the threshold value of the absolute value of the correlation coefficient is 0.8 in the above embodiment, this threshold value need only have a strong positive or negative correlation and may also be a value other than 0.8.

The above embodiment is an exposure process in which the exposure amount is a controlled parameter and the dimensional value is a response variable. However, the present invention can also be used in an etching process by using the etching time as a controlled parameter and the pattern dimensional value as a response variable, and monitoring apparatus parameters such as the internal pressure and internal temperature of a chamber of an etching apparatus. That is, the present invention is applicable to a semiconductor fabrication process using APC. The scope of claims indicates the technical scope of the present invention, and the technical scope of the present invention includes meanings equivalent to the scope of claims and all changes within the scope of claims.

What is claimed is:

1. A semiconductor fabrication apparatus management system, comprising:
   a sensor which monitors and outputs a plurality of apparatus parameters of a semiconductor fabrication apparatus which fabricates a semiconductor device;
   a measurement unit which measures a dimensional value of said semiconductor device, and outputs the dimensional value as dimensional data;
   an apparatus parameter storage unit which stores the apparatus parameters;
   a dimensional data storage unit which stores the dimensional data;
   an apparatus parameter controller which calculates predicted dimensional data by extracting the dimensional data from said dimensional data storage unit, and controls at least one of the plurality of apparatus parameters on the basis of the predicted dimensional data; and
   an abnormality factor extraction unit which analyzes correlations between the controlled apparatus parameter and other apparatus parameters, and extracts an abnormal apparatus parameter on the basis of a calculated correlation coefficient, wherein said apparatus parameter controller extracts the dimensional data and dimensional data of semiconductor devices fabricated in the past from said dimensional data storage unit, obtains an approximate expression indicating a time-series change of the extracted dimensional data by using a method of least squares, calculates a predicted value of dimensional data of a semiconductor device to be fabricated next on the basis of the approximate expression, and controls at least one of the plurality of apparatus parameters on the basis of the predicted value, said abnormality factor extraction unit checks on the basis of a value of the controlled apparatus parameter whether to analyze correlations between the controlled apparatus parameter and other apparatus parameters, calculates a correlation coefficient if the correlation analysis is to be performed, extracts an abnormal apparatus parameter on the basis of the calculated correlation coefficient, checks whether the abnormal apparatus parameter is controllable, outputs correction information of the abnormal apparatus parameter to said semiconductor fabrication apparatus if the abnormal apparatus parameter is controllable, and outputs abnormality factor information if the abnormal apparatus parameter is uncontrollable, and the semiconductor fabrication apparatus management system further comprises a display unit which displays an abnormality factor of said semiconductor fabrication apparatus on the basis of the abnormality factor information.

2. A system according to claim 1, wherein when calculating the predicted dimensional data by extracting the dimensional data from said dimensional data storage unit, said apparatus parameter controller calculates the predicted dimensional data by extracting dimensional data of at least three past lots.

3. A system according to claim 1, wherein when extracting the abnormal apparatus parameter on the basis of the correlation coefficient, said abnormality factor extraction unit extracts the abnormal apparatus parameter if an absolute value of the correlation coefficient is not less than 0.8.

4. A system according to claim 1, wherein
said semiconductor fabrication apparatus includes an exposure apparatus,
the apparatus parameters include an exposure amount and at least one of a focusing value, a developer temperature, and a reticle transmittance, and
said apparatus parameter controller controls the exposure amount.

5. A system according to claim 1, wherein
said semiconductor fabrication apparatus includes an etching apparatus,
the apparatus parameters include an etching time and at least one of an internal pressure and internal temperature of a chamber, and
said apparatus parameter controller controls the etching time.

* * * * *